(12) United States Patent
Nagata et al.

(10) Patent No.: US 8,825,055 B2
(45) Date of Patent: *Sep. 2, 2014

(54) BASE STATION, MOBILE COMMUNICATION SYSTEM USING THE BASE STATION, AND DATA TRANSFER METHOD

(71) Applicant: NEC Corporation, Tokyo (JP)

(72) Inventors: Jun Nagata, Tokyo (JP); Naoto Itaba, Tokyo (JP); Seiji Kondo, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,975

(22) Filed: Jun. 24, 2013

(65) Prior Publication Data

US 2013/0344870 A1    Dec. 26, 2013

Related U.S. Application Data

(63) Continuation of application No. 12/532,082, filed as application No. PCT/JP2008/055235 on Mar. 21, 2008, now Pat. No. 8,504,038.

(30) Foreign Application Priority Data

Mar. 20, 2007   (JP) ................................. 2007-071706

(51) Int. Cl.
| | |
|---|---|
| H04W 36/00 | (2009.01) |
| H04L 12/28 | (2006.01) |
| H04W 36/02 | (2009.01) |
| H04L 1/18 | (2006.01) |
| H04L 1/00 | (2006.01) |

(52) U.S. Cl.
CPC ............ *H04W 36/023* (2013.01); *H04W 36/02* (2013.01); *H04L 1/187* (2013.01); *H04L 1/1896* (2013.01); *H04L 2001/0092* (2013.01)
USPC ............ 455/436; 455/438; 370/331; 370/394

(58) Field of Classification Search
CPC .................................................... H04W 36/00
See application file for complete search history.

(56) References Cited

U.S. PATENT DOCUMENTS

| | | | |
|---|---|---|---|
| 5,940,371 | A | 8/1999 | Mitts et al. |
| 8,265,628 | B2 | 9/2012 | Lindstrom et al. |

(Continued)

FOREIGN PATENT DOCUMENTS

| | | |
|---|---|---|
| CA | 2684838 A1 | 11/2008 |
| CN | 1383337 A | 12/2002 |

(Continued)

OTHER PUBLICATIONS

Office Action dated Jul. 16, 2013, issued by the Japanese Patent Office in counterpart Japanese Application No. 2012-173895.

(Continued)

*Primary Examiner* — Erika A Washington
(74) *Attorney, Agent, or Firm* — Sughrue Mion, PLLC

(57) ABSTRACT

Provided is a handover originating base station which transmits data to a handover destination base station, for performing mobile communication terminal handover in a mobile communication system. The handover originating base station is provided with a means for transmitting data whose transmission is not confirmed by a communication terminal, with information which indicates data transmitted just before.

19 Claims, 9 Drawing Sheets

(56) References Cited

U.S. PATENT DOCUMENTS

| | | | |
|---|---|---|---|
| 8,504,038 B2 * | 8/2013 | Nagata et al. | 455/436 |
| 2002/0181437 A1 | 12/2002 | Ohkubo et al. | |
| 2006/0215662 A1 | 9/2006 | Zhang et al. | |
| 2006/0240830 A1 | 10/2006 | Ranta-aho et al. | |
| 2007/0270146 A1 | 11/2007 | Suzuki et al. | |
| 2007/0293254 A1 | 12/2007 | Jiang | |
| 2010/0046472 A1 | 2/2010 | Chun et al. | |

FOREIGN PATENT DOCUMENTS

| | | | |
|---|---|---|---|
| CN | 101047979 A | 10/2007 |
| JP | 09-186704 A | 7/1997 |
| JP | 2003-078937 A | 3/2003 |
| JP | 2003-324761 A | 11/2003 |
| JP | 2004282652 A | 10/2004 |
| JP | 2006-217219 A | 8/2006 |
| JP | 20076230 A | 1/2007 |
| JP | 2008546311 A | 12/2008 |
| WO | 2006130354 A1 | 12/2006 |
| WO | 2006135185 A2 | 12/2006 |
| WO | 2008136115 A1 | 11/2008 |

OTHER PUBLICATIONS

NEC, "Summary of email discussion on downlink reordering during LTE handover", 3GPP TSG-RAN WG2, Jan. 15-19, 2007, R2-070293, 10 pages total.
Korean Office Action issued on Mar. 10, 2011 in the corresponding Korean Patent Applicaiton No. 10-2009-7021787.
Japanese Office Action issued Sep. 14, 2011 in corresponding Japanese Patent Application No. 2009-509065.
First Office Action dated Sep. 7, 2011 issued by the State Intellectual Property Office of the People's Republic of China in counterpart Chinese Patent Application No. 200880009252.3.
Office Action, dated Feb. 21, 2014, issued by the Canadian Intellectual Property Office, in counterpart Application No. 2,680,687.
Office Action dated Mar. 5, 2014, issued by the State Intellectual Property Office of the P.R.C. in corresponding Chinese Application No. 201210059301.2.

* cited by examiner

BASE STATION, MOBILE COMMUNICATION SYSTEM USING THE BASE STATION, AND DATA TRANSFER METHOD

CROSS-REFERENCE TO RELATED APPLICATIONS

This application is a Continuation of U.S. patent application Ser. No. 12/532,082 filed Jan. 19, 2010, now U.S. Pat. No. 8,504,038 which claims priority from International Application No. PCT/JP2008/055235 filed Mar. 21, 2008, and Japanese Application No. 2007-071706 filed Mar. 20, 2007 the disclosures of which are incorporated herein in their entireties by reference.

TECHNICAL FIELD

The invention relates to a base station, a mobile communication system using the base station and a data transfer method, and more particularly, to a data transfer method when performing handover that is accompanied by movement of a mobile communication terminal.

BACKGROUND ART

A mobile communication network standardized by the 3rd Generation Partnership Project (3 GPP) (hereinafter, referred to as 3G network) comprises, as shown in FIG. 1, CN (Core Network) 10 and UTRAN (Universal Terrestrial Radio Access Network) 11. UTRAN 11 has a plurality of RNS (Radio Network Subsystem) 12, 13. RNS 12, 13 consist of RNC (Radio Network Controller; wireless base station controller) 14, 15 and NodeB (wireless base station apparatus) 16, 17, 18, 19, respectively.

A user equipment (UE) (not shown), which is a mobile communication terminal, can switch the NodeB, which are connected by a wireless link, and continue the communication while moving. This is called as "handover." The handover comprises a method (soft handover) in which downward data are copied in the RNC, the copied data are temporarily transmitted to a Source NodeB (handover originating base station) and a Target NodeB (handover destination base station) and the UE receives the data from both NodeB at the same time.

In addition, WO2004/030396 or Japanese Unexamined Patent Publication No. 2003-078937 discloses a technology in which downward data are buffered in the RNC, the data, which has not completely received by the UE from the Source NodeB, are again transmitted to the Target NodeB from the RNC and then transmitted to the UE from the Target NodeB to prevent omission of the downward data during the handover.

Meantime, for the purpose of improvement of a throughput of user data, reduction of delay of a call connection and transmission delay of user data, reduction of the number of nodes, reduction of an interface requiring the standardization and the like, the 3 GPP investigates a next generation (B3G: Beyond 3G) network (hereinafter, referred to as LTE/SAE network) that is called as LTE (Long Term Evolution) and SAE (System Architecture Evolution). As shown in FIG. 2, LTE/SAE network 20 comprises EUTRAN (Evolved UTRAN) 22 and Evolved CN 21. Nodes 23, 24 referred to as eNodeB are arranged in EUTRAN 22.

In LTE/SAE network 20, Evolved CN 21 and eNodeB 23, 24 are connected to each other by an interface called as S1 interface. In addition, eNodeB 23 and eNodeB 24 are connected to each other by an interface called as X2 interface.

In LTE/SAE network 20, it is investigated that when UE 30 performs the handover between the other eNodeB, data, which has not been completely transmitted to the UE, of the downward data transmitted to the Source eNodeB from Evolved CN 20, is transmitted to the Target eNodeB from the Source eNodeB and then to the UE from the Target eNodeB, thereby reducing occurrence of the data not to be transmitted.

Here, just after the handover, there exist in the Target eNodeB, as the downward data to be transmitted to the UE, the data transmitted from the Source eNodeB and the data directly transmitted to the Target eNodeB from the Evolved CN. Typically, when the TCP (Transmission Control Protocol) and the like are used in the upper layer, the change of the data sequence has influence on deterioration of a throughput. Thus, it is preferred to transmit the data to the UE in regular order as much as possible.

Additionally, since the data transmitted from the Source eNodeB is the data that has been transmitted toward the UE from the Evolved CN before the handover, it is preferred to transmit it to the UE before transmitting the data transmitted to the Target eNodeB from the Evolved CN, after the handover. However, the Target eNodeB does not always receive the data transmitted from the Source eNodeB before transmitting the data transmitted from the Evolved CN. Furthermore, the data sequence may be changed during the transmission.

Due to this, when the Target eNodeB desires to transmit the data to the UE in an order that the Evolved CN intends to transmit it to the UE, it is necessary that the Target eNodeB should rearrange, in regular order, the data transmitted from the Source eNodeB and the data transmitted from the Evolved CN and then transmit them.

As shown in FIG. 3, UE 30 may discontinuously complete to receive the downward data 1~6 that has been transmitted to UE 30 from the Source eNodeB. In this case, although, as data 2 of FIG. 3, for example, a transmission confirmation (ACK: Acknowledge) was made in Source eNodeB 23, when the data (data 1), which should be transmitted before transmitting the corresponding data, is not completely transmitted, it is considered a method of transmitting data 2 to Target eNodeB 24 and a method of not transmitting it.

For a case that data 2 is transmitted to Target eNodeB 24, even though it has been completely transmitted to UE 30 from Source eNodeB 23, it is transmitted to Target eNodeB 24, so that the network between both eNodeB is consumed. Further, the data may be again transmitted to UE 30 from Target eNodeB 24, so that waste occurs.

In addition, for a case that data 2 is not transmitted to Target eNodeB 24, Target eNodeB 24 discontinuously receives the data transmitted from Source eNodeB 23 (i.e., it receives data 3 after receiving data 1). Thus, Target eNodeB 24 cannot determine whether Source eNodeB 24 discontinuously transmits the data or there occurs loss or delay on the network with respect to data 2. Regarding this, it is required a process of waiting for a receiving by starting a timer that is pre-provided.

Meanwhile, a Japanese Unexamined Patent Publication No. 2003-078937 discloses that when a base station is switched due to handover, a buffer state synchronizing signal is transmitted and received between base stations so as to prevent the data from being duplicated or lost. However, in order to transmit and receive the buffer state synchronizing signal in addition to the data transfer, the throughput is increased and the communication network should be consumed between both base stations.

DISCLOSURE OF THE INVENTION

Thus, the invention has been made to solve the above problems occurring when a UE discontinuously completes to receive data from a Source eNodeB with respect to data transfer of handover to a Target eNodeB from the Source eNodeB in a LTE/SAE network. An object of the invention is to provide a base station without increase of a throughput and a timer and waste of the network between base stations, a mobile communication system using the base station, and a data transfer method.

A base station of the invention is a handover originating base station that transmits data to a handover destination base station when performing handover of a mobile communication terminal in a mobile communication system and is provided with means for transmitting data whose transmission is not confirmed by the mobile communication terminal to the handover destination base station together with information indicating data transmitted just before.

Another base station of the invention is a handover originating base station that transmits data to a handover originating base station when performing handover of a mobile communication terminal in a mobile communication system and is provided with means for transmitting data whose transmission is not confirmed by the mobile communication terminal to the handover destination base station together with information indicating data to be transmitted just after.

Another base station of the invention is a handover originating base station that transmits data to a handover originating base station when performing handover of a mobile communication terminal in a mobile communication system and is provided with means for transmitting data whose transmission is not confirmed by the mobile communication terminal to the handover destination base station together with information indicating data whose transmission has been already confirmed.

Another base station of the invention is a handover originating base station that transmits data to a handover originating base station when performing handover of a mobile communication terminal in a mobile communication system and is provided with means for transmitting the data to the handover destination base station together with information indicating whether there is a transmission confirmation from the mobile communication terminal.

A mobile communication system of the invention comprises the above base stations.

A data transfer method of the invention is a data transfer method in a handover originating base station that transmits data to a handover destination base station when performing handover of a mobile communication terminal in a mobile communication system. The method comprises transmitting data whose transmission is not confirmed by the mobile communication terminal to the handover destination base station together with information indicating data transmitted just before.

Another data transfer method of the invention is a data transfer method in a handover originating base station that transmits data to a handover originating base station when performing handover of a mobile communication terminal in a mobile communication system. The method comprises transmitting data whose transmission is not confirmed by the mobile communication terminal to the handover destination base station together with information indicating data to be transmitted just after.

Another data transfer method of the invention is a data transfer method in a handover originating base station that transmits data to a handover originating base station when performing handover of a mobile communication terminal in a mobile communication system. The method comprises transmitting data whose transmission is not confirmed by the mobile communication terminal to the handover destination base station together with information indicating data whose transmission has been already confirmed.

Another data transfer method of the invention is a data transfer method in a handover originating base station that transmits data to a handover originating base station when performing handover of a mobile communication terminal in a mobile communication system. The method comprises transmitting data whose transmission is not confirmed by the mobile communication terminal to the handover destination base station together with information indicating whether there is an acknowledgement from the mobile communication terminal.

A program of the invention is a program for enabling a computer to execute a data transfer method in a handover originating base station that transmits data to a handover destination base station when performing handover of a mobile communication terminal in a mobile communication system. The program comprises a process of transmitting data whose transmission is not confirmed by the mobile communication terminal to the handover destination base station together with information indicating data transmitted just before.

Another program of the invention is a program for enabling a computer to execute a data transfer method in a handover originating base station that transmits data to a handover originating base station when performing handover of a mobile communication terminal in a mobile communication system. The program comprises a process of transmitting data whose transmission is not confirmed by the mobile communication terminal to the handover destination base station together with information indicating data to be transmitted just after.

Another program of the invention is a program for enabling a computer to execute a data transfer method in a handover originating base station that transmits data to a handover originating base station when performing handover of a mobile communication terminal in a mobile communication system. The program comprises a process of transmitting data whose transmission is not confirmed by the mobile communication terminal to the handover destination base station together with information indicating data whose transmission has been already confirmed.

Another program of the invention is a program for enabling a computer to execute a data transfer method in a handover originating base station that transmits data to a handover originating base station when performing handover of a mobile communication terminal in a mobile communication system. The program comprises a process of transmitting data whose transmission is not confirmed by the mobile communication terminal to the handover destination base station together with information indicating whether there is an acknowledgement from the mobile communication terminal.

According to the invention, in the network that transmits data between base stations while performing handover of a mobile communication terminal, the handover destination base station can determine that the data is not transmitted thereto while the handover originating base station does not transmit the data, which has been completely received by the mobile communication terminal from the handover originating base station, to the handover destination base station. Thus, it is not necessary to perform the process of waiting for the data not to be transmitted. In addition, it is possible to prevent the data from being duplicately transmitted from both base stations. Further, it is possible to reduce the consumption of the network between both base stations.

BEST MODE FOR CARRYING OUT THE INVENTION

Figure 1:
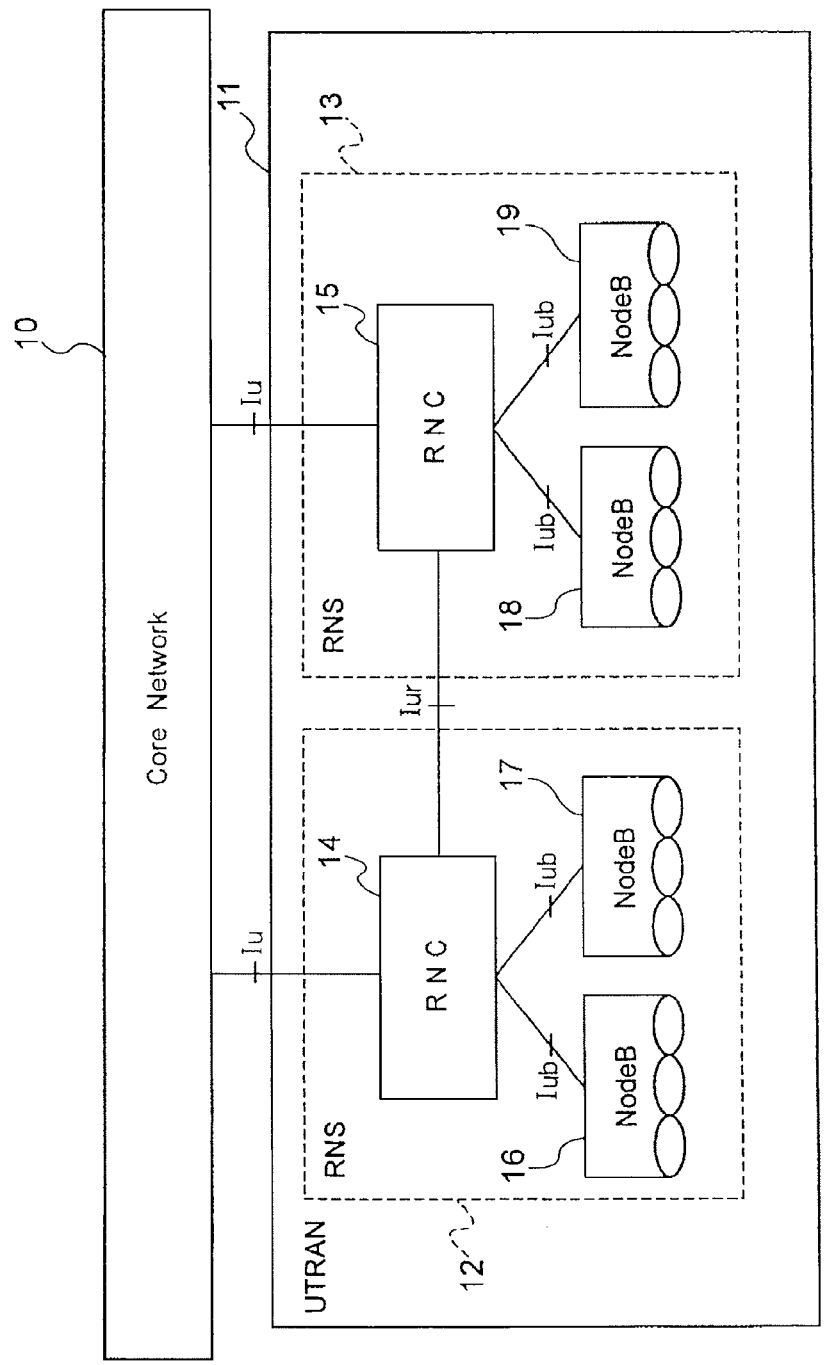
FIG. 1 is a view schematically showing a mobile communication system that is standardized by 3GPP.

In the followings, the invention will be more specifically described with reference to the drawings. A system structure of the invention is same as the system shown in FIG. 2. Again referring to FIG. 2, LTE/SAE network 20 comprises Evolved CN 21 and EUTRAN 22. The plurality of eNodeB 23, 24 are arranged in EUTRAN 22.

eNodeB 23, 24 are nodes having combined a part of functions of RNC 14, 15 of the 3G network shown in FIG. 1 and functions corresponding to each of NodeB (wireless base station apparatus) 16~19. Each eNodeB is connected to the Evolved CN by the interface called as S1 and eNodeB are connected to each other by the interface called as X2. Meanwhile, the S1 and X2 interfaces are logical connections, and according to circumstances, the X2 interface is physically shared with the S1 interface, for example.

In addition, Evolved CN 20 is also connected to an external network such as Internet, a wireless LAN network and the like. The data (downward data), which is received by UE 30 from the external network, another mobile communication terminal and the like, is transmitted from Evolved CN 20 to eNodeB to which UE 30 is connected, and transmitted to UE 30 through a wireless link. When UE 30 performs the handover to another eNodeB while continuing the communication, data, which has not been transmitted to UE 30 or whose transmission is not confirmed although it has been completely transmitted, of the downward data received by eNodeB from Evolved CN 20 is transmitted to eNodeB, which is the handover destination, through the X2 interface. UE 30 receives the transmitted data from eNodeB that is the handover destination.

Figure 2:
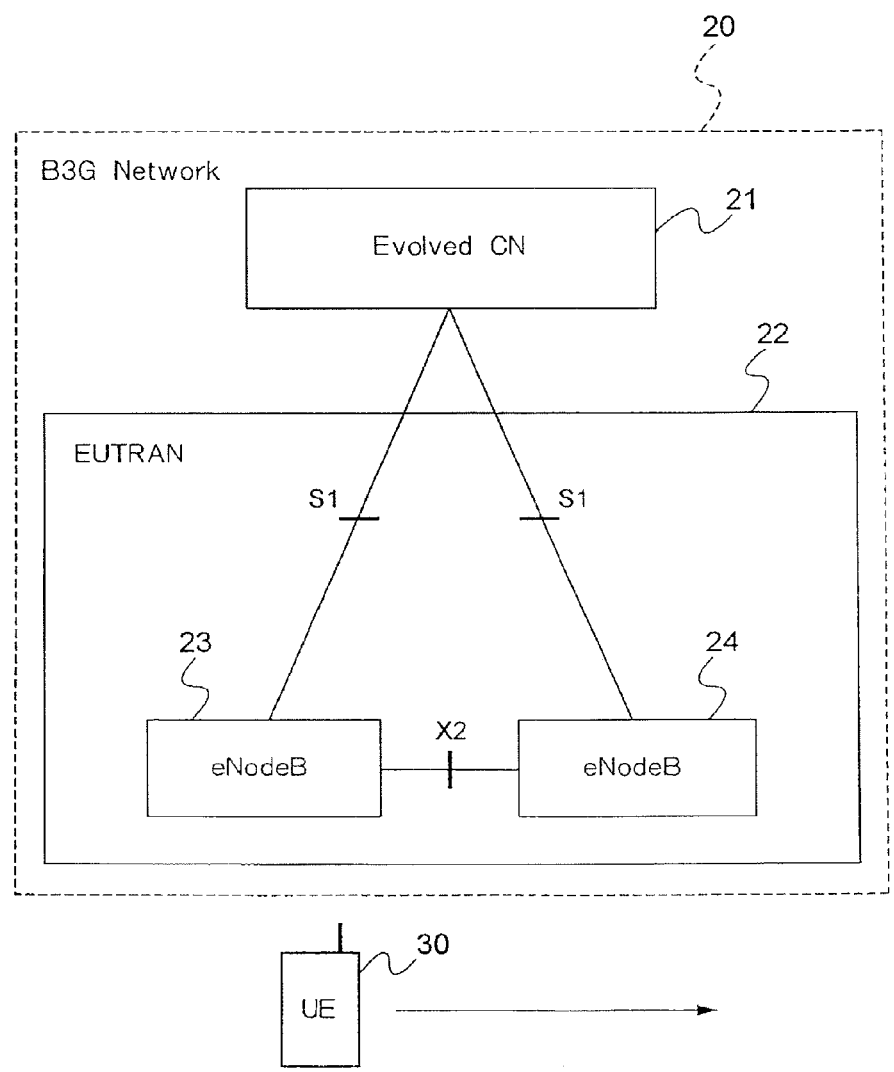
FIG. 2 is a view schematically showing a LTE/SAE network that is a next generation network.
Figure 4:
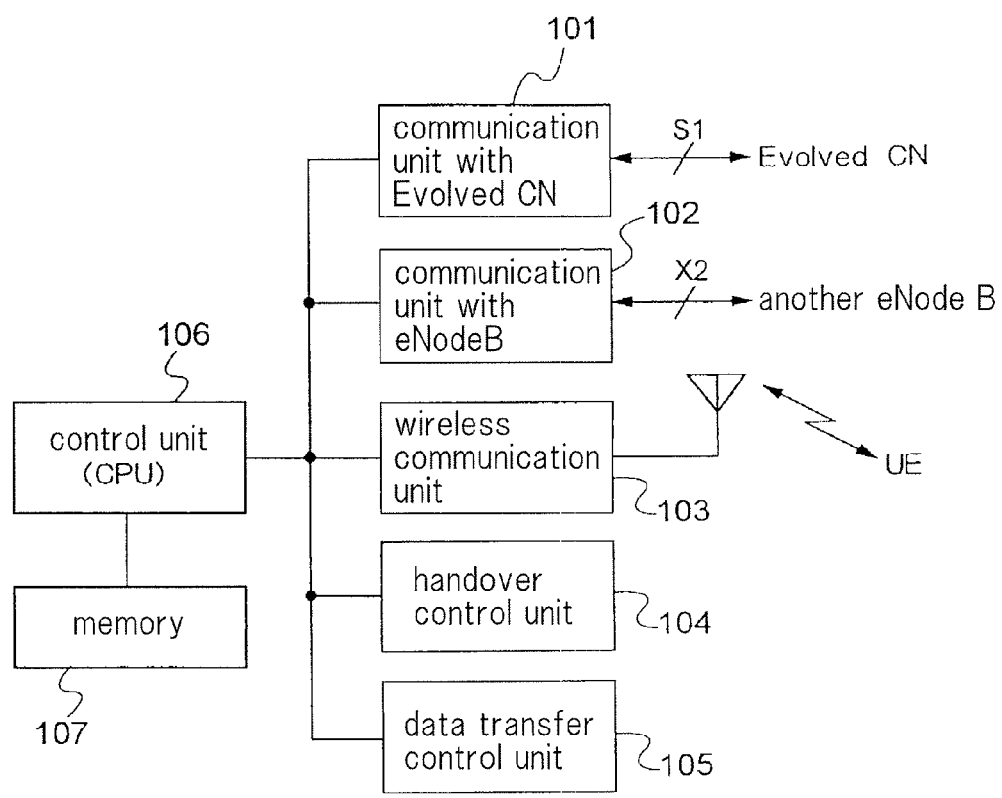
FIG. 4 is a schematic block diagram of a base station according to an exemplary embodiment of the invention.

Function blocks of eNodeB 23, 24 of FIG. 2 are shown in FIG. 4. Meanwhile, only parts related to the invention are shown in FIG. 4. Referring to FIG. 4, eNodeB according to an exemplary embodiment of the invention comprises communication unit 101 with Evolved CN that communicates with Evolved CN 21, communication unit 102 with eNodeB that communicates with another eNodeB, wireless communication unit 103 that communicates with UE 30, handover control unit 104 that controls handover of UE 30, data transfer control unit 105 that controls data transfer to be performed during the handover, control unit (CPU) 106 that controls the respective units, and memory 107 that stores sequences of the control operations of control unit 106 as a program in advance and functions as a operational memory.

Figure 3:
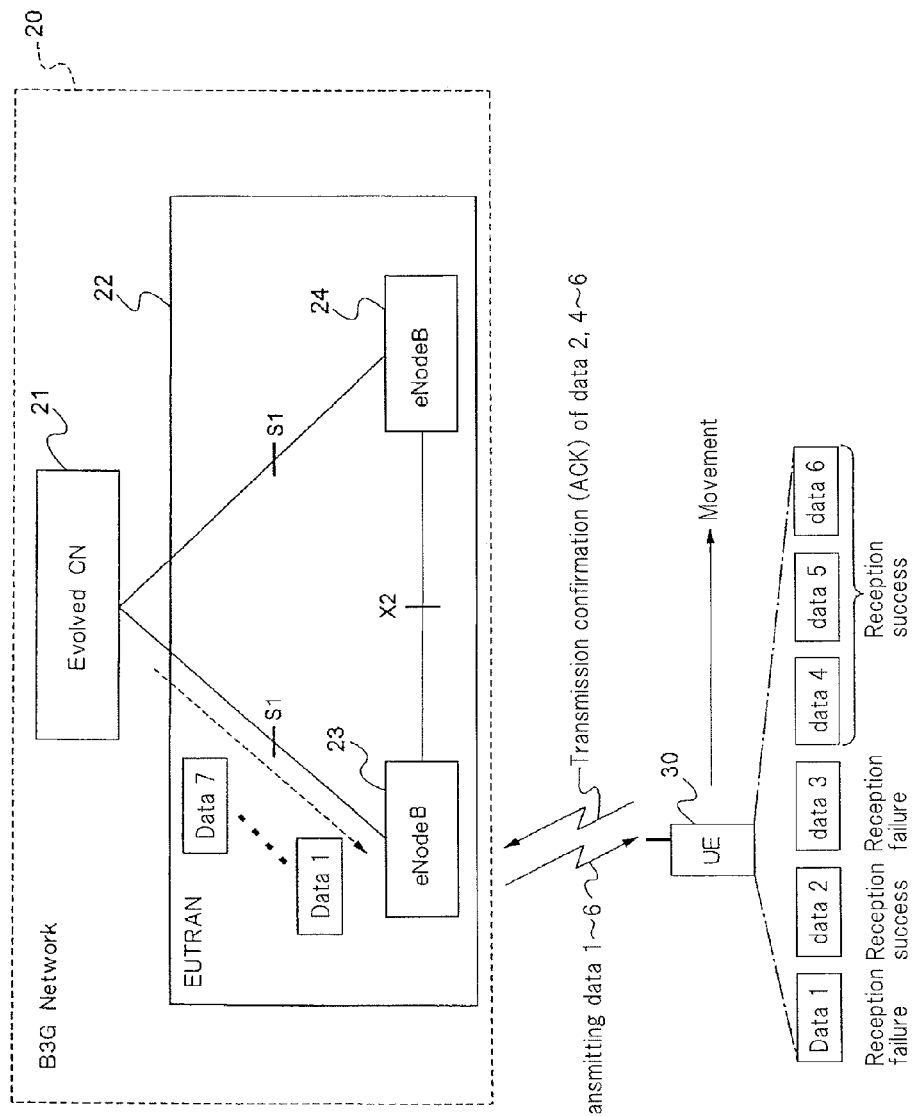
FIG. 3 is a view showing an example of a data flow when performing handover of a mobile communication terminal in the network shown in FIG. 2.

Here, as shown in FIG. 3, it is assumed that downward data 1~7 should be transmitted to UE 30 from Source eNodeB 23.

Figure 5:
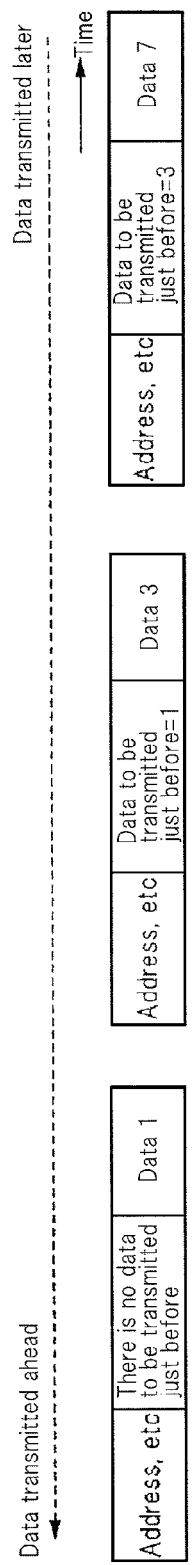
FIG. 5 is a view schematically illustrating an operation of a first exemplary embodiment of the invention.

Regarding this case, a first exemplary embodiment of the invention will be described with reference to FIG. 5. The downward data, which is transmitted to Target eNodeB 24 from Source eNodeB 23 accompanied by the handover, is data, which has not been transmitted to UE 30 or whose transmission is not confirmed although it has been completely transmitted, of the data that should be transmitted to UE 30 in Source eNodeB 23. At this time, as shown in FIG. 5, Source eNodeB 23 provides the data to be transmitted with information of the data transmitted just before and then transmits it to Target eNodeB 24.

In other words, for example, when Source eNodeB transmits data 1, 3 and 7 to Target eNodeB, Source eNodeB provides data 3 with information indicating that data 1 has been transmitted just before and data 7 with information indicating that data 3 has been transmitted just before, and transmits the data to Target eNodeB.

By doing so, the Target eNodeB can recognize that the data is being discontinuously transmitted without transmitting the data whose transmission has been already confirmed in the Source eNodeB to the Target eNodeB. Thus, it is not necessary to perform the process of waiting for the data not to be transmitted, by using a timer. In addition, it is possible to prevent the data, which has been completely received from the Source eNodeB, from being duplicately transmitted from the Target eNodeB. Meanwhile, for example, a sequence number may be considered as the information indicating the data that has been transmitted just before.

An operation of an exemplary embodiment of the invention will be described with reference to the sequence view of FIG. 6. As shown in FIG. 3, it is assumed that UE 30 intends to perform the handover to a subordinate cell of eNodeB 24 from a subordinate cell of eNodeB 23 and data 2 and data 4~6 have been completely received from the Source eNodeB. In addition, it is assumed that the Source eNodeB has received the transmission confirmations (ACK) of these data and Evolved CN 21 has received data 1~7.

The UE performs the communication while moving in the LTE/SAE network and receives the downward user data, which originates from the Evolved CN (MME/UPE: Mobile Management Entity/User Equipment Entity), from the Source eNodeB (steps S1 and S2). At this time, the UE monitors the surrounding wireless situations and uses the allotted upward link (step S3) to report it to the Source eNodeB (step S4).

The Source eNodeB determines to hand over the UE to the Target eNodeB, based on the reported wireless situations (step S5). Then, the Source eNodeB informs the Target eNodeB of the determination and transmits information (Context Data) necessary for it to the Target eNodeB (step S6). The Target eNodeB determines to accept the handover, stores the information of the UE (Context Data) and supplements C-RNTI (Customer-Radio Network Temporary Identity) (step S7). Then, the Target eNodeB replies to the Source eNodeB and transmits the necessary information to the Source eNodeB (step S8).

The Source eNodeB uses the allotted downward link (step S9) to instruct the UE on the handover (step S10) and transmits the data, which has not been transmitted to the UE and whose transmission is not confirmed from the UE although it has been completely transmitted, of the downward data being held to the Target eNodeB (steps S12 and S13).

In the above example, the data are data 1, 3 and 7. At this time, as shown in FIG. 5, the data to be transmitted is provided with the information of the data transmitted just before, which data is then transmitted to the Target eNodeB. The Target eNodeB buffers the data from the Source eNodeB (step S14).

Meanwhile, the step S11 is a process that the UE leaves from the old cell of the Source eNodeB and starts to establish a synchronization with a new cell of the Target eNodeB in response to the handover instruction from the Source eNodeB (step S10).

The Target eNodeB refers to the information of the data transmitted just before, which is provided to the data transmitted from the Source eNodeB, and thus determines whether the data, which has been transmitted from the Source eNodeB before transmitting the data received now, has been completely received already. For example, it is assumed that the Target eNodeB has received the data, which has been transmitted from the Source eNodeB, in an order of data 1 and data 3. In this case, when data 3 is provided with the information indicating that the data transmitted just before from the Source eNodeB is data 1, it is possible to judge that data 2 will not be transmitted.

However, for example, when the Target eNodeB receives data 3 from the Source eNodeB and data 3 is provided with the information indicating that the data transmitted just before is data 2, it may be possible that data 2 is lost or delayed on the network. Thus, it is considered to perform a process of waiting for data 2 for a predetermined time period, and the like.

Then, a synchronization process (step S15), an uplink allotting process (step S16) and the like are performed between the UE and the Target eNodeB, and the UE notifies the Target eNodeB of the handover (step S17). Then, the Target eNodeB notifies the Evolved CN to transmit the downward data having a destination of the UE to the Target eNodeB because the UE is handed over (steps S19 and S20). At these steps, the Evolved CN starts to transmit the data to the Target eNodeB (steps S23 and S24).

The former data has been transmitted to the Source eNodeB (step S18) and then is transmitted to the Target eNodeB from the Source eNodeB (steps S21 and S22). Hence, although the data from the Source eNodeB and the data from the Evolved CN may be mixed in the Target eNodeB, it is considered to control an order of the data with sequence numbers and the like. At this time, even when the data transmitted from the Source eNodeB are discontinuously received, it is possible to determine whether or not to expect to receive the data that has not been received, according to the above method. Then, the data is transmitted to the UE from the Evolved CN through the Target eNodeB (steps S24 and S25).

Figure 6:
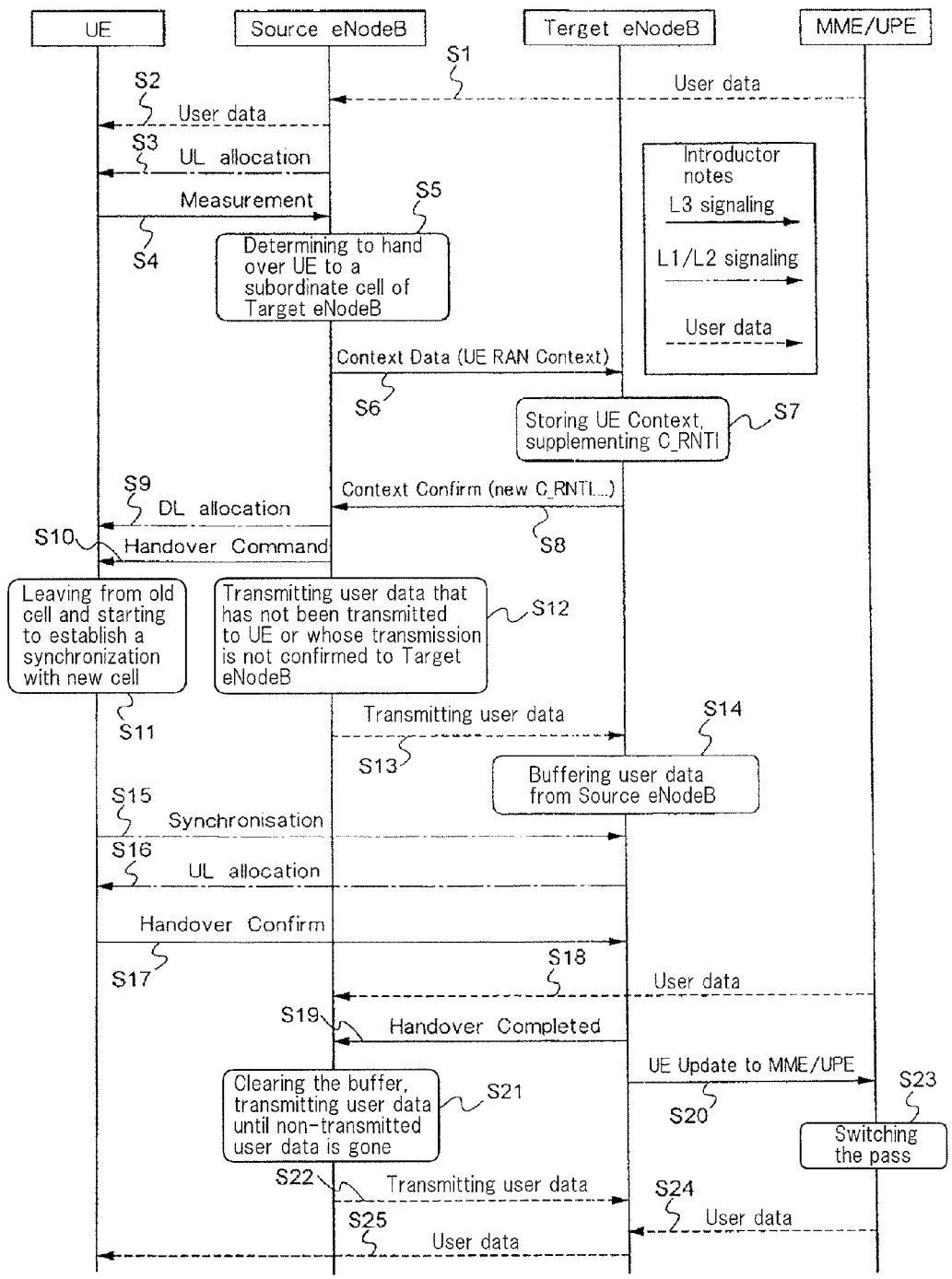
FIG. 6 is a sequence view showing an operation of an exemplary embodiment of the invention.

Meanwhile, in FIG. 6, the solid line indicates a L3 (Layer 3: Network Layer) signaling, the dashed dotted line indicates a L1/L2 (Layer 2/3: Physical Layer/Data Link Layer) signaling and the broken line indicates the user data.

Figure 7:
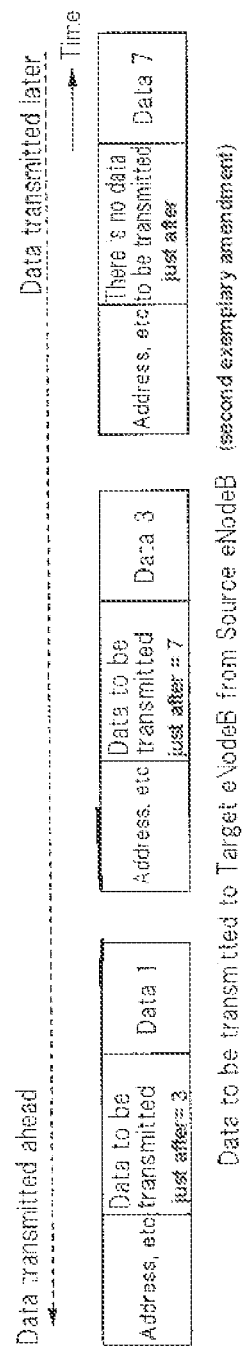
FIG. 7 is a view schematically illustrating an operation of a second exemplary embodiment of the invention.

In the followings, a second exemplary embodiment of the invention will be described. This exemplary embodiment is same as the first exemplary embodiment with respect to the system structure and the function blocks of the eNodeB. In this exemplary embodiment, the information to be included in the data to be transmitted is data to be transmitted just after. For example, as shown in FIG. 7, when the Source eNodeB transmits data 1, 3 and 7 to the Target eNodeB, it enables data 1 to include information indicating that the data to be transmitted just after is data 3 and data 3 to include information indicating that the data to be transmitted just after is data 7.

In this case, the data to be transmitted last is provided with information indicating that there is no data to be transmitted just after, thereby enabling the Target eNodeB to clearly recognize the last data.

Figure 8:
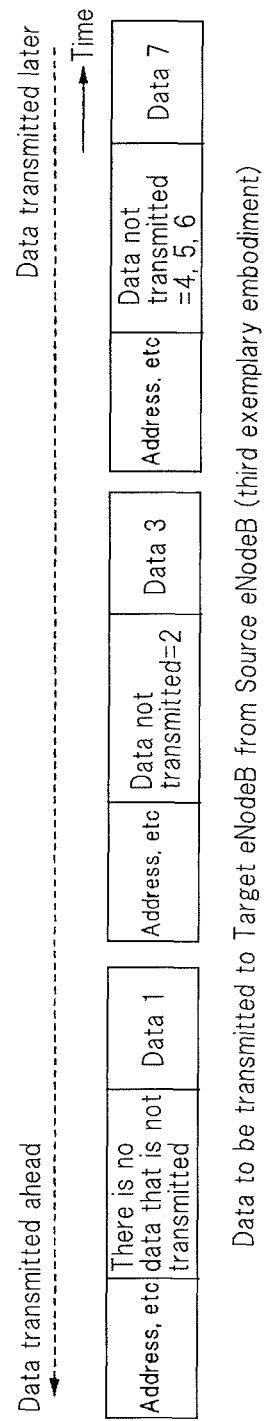
FIG. 8 is a view schematically illustrating an operation of a third exemplary embodiment of the invention.

In the followings, a third exemplary embodiment of the invention will be described. This exemplary embodiment is same as the first exemplary embodiment with respect to the system structure and the function blocks of the eNodeB. In this exemplary embodiment, the information to be included in the data to be transmitted includes information of the data that will not be transmitted. For example, as shown in FIG. 8, when the Source eNodeB transmits data 1, 3 and 7 to the Target eNodeB, it is considered that the Source eNodeB enables data 3 to include information indicating that data 2 will not be transmitted and data 7 to include information indicating that data 4~6 will not be transmitted.

The effects of this exemplary embodiment are same as those of the former exemplary embodiment. However, an amount of information to be included is increased. In addition, in FIG. 8, the information of data that will not be transmitted is included in a packet to be transmitted just after. However, it may be included in data to be transmitted just before.

Figure 9:
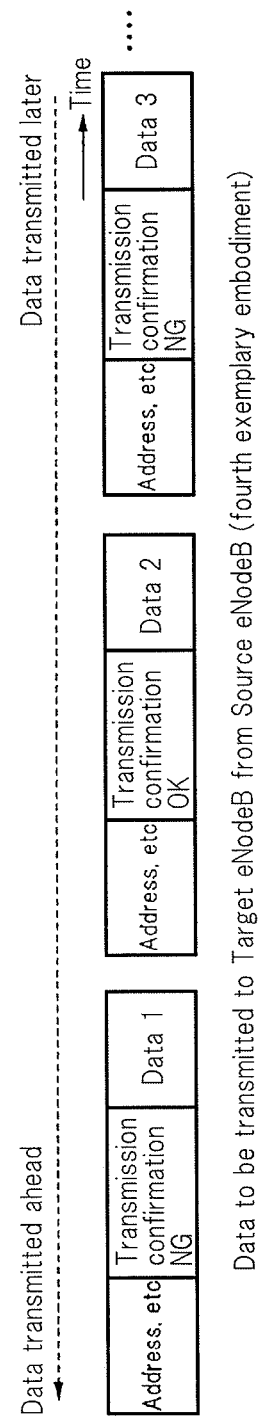
FIG. 9 is a view schematically illustrating an operation of a fourth exemplary embodiment of the invention.

In the followings, a fourth exemplary embodiment of the invention will be described. This exemplary embodiment is same as the first exemplary embodiment with respect to the system structure and the function blocks of the eNodeB. In this exemplary embodiment, as shown in FIG. 9, the data for which a transmission confirmation has been received in the Source eNodeB is also transmitted to the Target eNodeB. However, the data is provided with information indicating that the transmission confirmation has been received and is then transmitted. In this case, although it is impossible to save the network source between the Source eNodeB and the Target eNodeB, it is possible to prevent the data, which has been completely received in the Source eNodeB, from being duplicately transmitted from the Target eNodeB.

As described above, according to the invention, in the network that transmits data between base stations that are eNodeB while performing handover of a mobile communication terminal, the handover destination base station can determine that the data is not transmitted thereto while the handover originating base station does not transmit the data, which has been completely received by the mobile communication terminal from the handover originating base station, to the handover destination base station. Thus, it is not necessary to perform the process of waiting for the data not to be transmitted. In addition, it is possible to prevent the data from being duplicately transmitted from both base stations. Further, it is possible to reduce the consumption of the network between both base stations.

In the meantime, it is clear that the operation sequences of each exemplary embodiment can be stored in advance as a program in a recording medium such as ROM and then read and executed by a computer (CPU).

While the invention has been described with reference to exemplary embodiments thereof, the invention is not limited to these embodiments. It will be understood by those of ordinary skill in the art that various changes in form and details may be made therein within the invention.

This application claims the priority of Japanese Patent Application No. 2007-071706 filed on Mar. 20, 2007, the disclosures of which are incorporated herein by reference.

The invention claimed is:

1. A base station of a mobile communication system, the base station comprising:
   first communication means for communicating with a mobile station;
   second communication means for communicating with a core network; and
   third communication means for transmitting a sequence number of a first missing data to a second base station during handover of the mobile station to the second base station from the first base station, if there is a plurality of missing data that needs to be retransmitted among data transmitted between the mobile station and a core network, wherein the sequence number of the first missing data is transmitted to the second base station separately from a sequence number of other missing data of the plurality of missing data.

2. The base station according to claim 1, wherein the first missing data is data that is retransmitted between the mobile station and the second base station.

3. The base station according to claim 1, wherein the third communication means transmits second missing data to the second base station together with the sequence number of the first missing data, and wherein the first missing data is transmitted by the base station to the second base station after transmitting the second missing data.

4. The base station according to claim 1, wherein the first base station transmits the sequence number of the first missing data to the second base station using an X2 interface.

5. A mobile communication system comprising:
a core network;
a mobile station;
a first base station; and
a second base station,
wherein the first base station transmits a sequence number of a first missing data to the second base station during handover of the mobile station to the second base station from the first base station, if there is a plurality of missing data that needs to be retransmitted among data transmitted between the mobile station and the core network,
and wherein the first base station transmits the sequence number of the first missing data to the second base station separately from a sequence number of other missing data of the plurality of missing data.

6. The mobile communication system according to claim 5, wherein the first missing data is retransmitted between the mobile station and the second base station.

7. The mobile communication system according to claim 5, wherein the first base station transmits second missing data to the second base station together with the sequence number of the first missing data, and
wherein the first missing data is transmitted by the first base station to the second base station after transmitting the second missing data.

8. The mobile communication system according to claim 5, wherein the first base station transmits the sequence number of the first missing data to the second base station using an X2 interface.

9. A method of controlling a base station of a mobile communication system, comprising:
communicating with a mobile station;
communicating with a core network; and
transmitting a sequence number of a first missing data to a second base station from a first base station during handover of the mobile station to the second base station from the first base station, if there is a plurality of missing data that needs to be retransmitted among data transmitted between the mobile station and the core network,
wherein the transmitting the sequence number of the first missing data to the second base station is a transmission separate from transmitting a sequence number of other missing data of the plurality of missing data.

10. The method according to claim 9, wherein the first missing data is retransmitted between the mobile station and the second base station.

11. The method according to claim 9, wherein the first base station transmits second missing data to the second base station together with the sequence number of the first missing data, and
wherein the first missing data is transmitted by the first base station to the second base station after transmitting the second missing data.

12. The method according to claim 9, wherein the first base station transmits the sequence number of the first missing data to the second base station using an X2 interface.

13. A mobile station in a mobile communication system comprising a first base station and a second base station, the mobile station comprising:
means for performing a handover to the second base station from the first base station;
means for communicating with the first base station which transmits a sequence number of a first missing data to the second base station during the handover to the second base station from the first base station, if there is a plurality of missing data that needs to be retransmitted among data transmitted between the mobile station and a core network,
wherein the sequence number of the first missing data is transmitted to the second base station separately from a sequence number of other missing data of the plurality of missing data.

14. The mobile station according to claim 13, wherein the first missing data is retransmitted between the mobile station and the second base station.

15. The mobile station according to claim 13, wherein the first base station transmits second missing data to the second base station together with the sequence number of the first missing data; and
wherein the first missing data is transmitted by the first base station to the second base station after transmitting the second missing data.

16. The mobile station according to claim 13, wherein the first base station transmits the sequence number of the first missing data to the second base station using an X2 interface.

17. A mobile station in a mobile communication system comprising a first base station and a second base station, the mobile station configured to:
perform a handover to the second base station from the first base station; and
communicate with the first base station which transmits a sequence number of a first missing data to the second base station during the handover to the second base station from the first base station, if there is a plurality of missing data that needs to be retransmitted among data transmitted between the mobile station and a core network,
wherein the sequence number of the first missing data is transmitted to the second base station separately from a sequence number of other missing data of the plurality of missing data.

18. A base station of a mobile communication system, the base station comprising:
a wireless communication unit configured to communicate with a mobile station;
a core network communication unit configured to communicate with a core network; and
an eNode B communication unit configured to transmit, to a second base station, a sequence number of a first missing data to a second base station during handover of the mobile station to the second base station from the first base station, if there is a plurality of missing data that needs to be retransmitted among data transmitted between the mobile station and a core network, wherein the sequence number of the first missing data is transmitted to the second base station separately from a sequence number of other missing data of the plurality of missing data.

19. A mobile station in a mobile communication system comprising a first base station and a second base station, the mobile station comprising:

a unit configured to perform a handover to the second base station from the first base station;

a communication unit configured to communicate the first base station which transmits a sequence number of a first missing data to the second base station during the handover to the second base station from the first base station, if there is a plurality of missing data that needs to be retransmitted among data transmitted between the mobile station and a core network, wherein the sequence number of the first missing data is transmitted to the second base station separately from a sequence number of other missing data of the plurality of missing data.

\* \* \* \* \*